(12) United States Patent
Platner et al.

(10) Patent No.: US 12,470,793 B2
(45) Date of Patent: Nov. 11, 2025

(54) INTEGRATED SENSOR-LENS ASSEMBLIES IN IMAGE CAPTURE APPARATUSES AND METHODS OF ASSEMBLING THE SAME

(71) Applicant: GoPro, Inc., San Mateo, CA (US)

(72) Inventors: David Thomas Platner, San Francisco, CA (US); Ian Copeland Griggs, San Francisco, CA (US); Jonathan Stern, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 241 days.

(21) Appl. No.: 18/216,956

(22) Filed: Jun. 30, 2023

(65) Prior Publication Data
US 2025/0008205 A1   Jan. 2, 2025

(51) Int. Cl.
*H04N 23/54* (2023.01)
*H04N 23/51* (2023.01)
*H04N 23/55* (2023.01)

(52) U.S. Cl.
CPC ............. *H04N 23/54* (2023.01); *H04N 23/51* (2023.01); *H04N 23/55* (2023.01)

(58) Field of Classification Search
CPC ......... H04N 23/54; H04N 23/51; H04N 23/55
USPC ....................................................... 348/374
See application file for complete search history.

(56) References Cited

U.S. PATENT DOCUMENTS

2014/0063307 A1* 3/2014 Wang ..................... H04N 23/57
                                                              348/302

* cited by examiner

*Primary Examiner* — Joel W Fosselman
(74) *Attorney, Agent, or Firm* — Young Basile Hanlon & MacFarlane, P.C.

(57) ABSTRACT

An integrated sensor-lens assembly for an image capture apparatus. The integrated sensor-lens assembly defines an optical axis and includes: a lens holder, a cover glass holder that is secured to the lens holder at a first interface; and a printed circuit board that is secured to the cover glass holder at a second interface, whereby the cover glass holder indirectly connects the lens holder to the printed circuit board such that the lens holder and the printed circuit board are devoid of any direct connection.

20 Claims, 10 Drawing Sheets

INTEGRATED SENSOR-LENS ASSEMBLIES IN IMAGE CAPTURE APPARATUSES AND METHODS OF ASSEMBLING THE SAME

TECHNICAL FIELD

The present disclosure relates to integrated sensor-lens assemblies (ISLAs) in image capture apparatuses and methods of assembling the same.

BACKGROUND

Image capture apparatuses are used in a variety of applications (e.g., handheld cameras and video recorders, cell phones, drones, vehicles, etc.) and include one or more lenses (or other such optical elements) and one or more image sensors. The lens(es) capture content by receiving and focusing light, and the image sensor(s) convert the captured content into an electronic image signal that is processed by an image signal processor to generate an image. In some image capture apparatuses, the lens(es) and the image sensor(s) are integrated into a single unit, which is known as an ISLA.

In order to produce high-quality, focused images, the lens(es) and the corresponding sensor(s) must be properly aligned in multiple degrees-of-freedom, as even small misalignments (e.g., in the position or the tilt of the lens(es) and/or the image sensor(s)) can negatively impact image quality. To address this concern, the present disclosure describes various structures, components, and methods that improve the alignment and connection of the components of an ISLA during the assembly of an image capture apparatus.

SUMMARY

In one aspect of the present disclosure, an integrated sensor-lens assembly for an image capture apparatus is disclosed. The integrated sensor-lens assembly defines an optical axis and includes: a lens holder; a cover glass holder that is secured to the lens holder at a first interface; and a printed circuit board that is secured to the cover glass holder at a second interface, whereby the cover glass holder indirectly connects the lens holder to the printed circuit board such that the lens holder and the printed circuit board are devoid of any direct connection.

In certain embodiments, the integrated sensor-lens assembly may further include a lens barrel that is located with the lens holder and which houses an optical group.

In certain embodiments, the integrated sensor-lens assembly may further include an image sensor that is supported by the printed circuit board, wherein the optical group is actively aligned with the image sensor.

In certain embodiments, the cover glass holder may be unitary in construction.

In certain embodiments, the cover glass holder may include an inner module and an outer module that is connected to the inner module.

In certain embodiments, the inner module and the outer module may be configured as discrete components of the cover glass holder.

In certain embodiments, the inner module may include a first material of construction, and the outer module may include a second material of construction that is different than the first material of construction.

In certain embodiments, the inner module may define an outer radial wall, and the outer module may define an inner radial wall that is in contact with the outer radial wall.

In certain embodiments, the cover glass holder may be configured such that the outer radial wall and the inner radial wall are oriented in generally parallel relation to the optical axis.

In certain embodiments, the integrated sensor-lens assembly may further include an electrical connector that is spaced radially outward from the cover glass holder with respect to the optical axis.

In certain embodiments, the electrical connector may be generally aligned with second interface and spaced axially from the first interface along the optical axis.

In another aspect of the present disclosure, an integrated sensor-lens assembly for an image capture apparatus is disclosed. The integrated sensor-lens assembly defines an optical axis and includes: a lens holder; a lens barrel that is located within the lens holder and which houses an optical group; a cover glass holder that is secured to the lens holder at a first interface using a first adherent; a printed circuit board that is secured to the cover glass holder at a second interface using a second adherent that is different than the first adherent such that the lens holder is spaced from the printed circuit board along the optical axis; and an image sensor that is supported by the printed circuit board and which is actively aligned with the optical group.

In certain embodiments, the cover glass holder may be unitary in construction.

In certain embodiments, the cover glass holder may include an inner module that defines an outer radial wall and an outer module that defines an inner radial wall, which is connected to the outer radial wall of the inner module.

In certain embodiments, the inner module and the outer module may include dissimilar materials of construction.

In certain embodiments, the integrated sensor-lens assembly may further include an electrical connector that is spaced radially outward from the cover glass holder with respect to the optical axis.

In certain embodiments, the electrical connector may be generally aligned with the second interface and is spaced axially from the first interface along the optical axis.

In another aspect of the present disclosure, a method of assembling an integrated sensor-lens assembly for an image capture apparatus is disclosed that includes: actively aligning a lens holder with a cover glass holder; connecting the lens holder to the cover glass holder; and connecting the cover glass holder to a printed circuit board using a second adherent such that the lens holder is spaced from the printed circuit board along an optical axis of the ISLA.

In certain embodiments, connecting the lens holder to the cover glass holder may include UV curing an adherent located between the lens holder and the cover glass holder.

In certain embodiments, the method may further include securing an electrical connector to the printed circuit board such that the electrical connector is spaced axially from the adherent along the optical axis.

In certain embodiments, the method may further include assembling the cover glass holder.

In certain embodiments, assembling the cover glass holder may include connecting an inner module of the cover glass holder to an outer module of the cover glass holder.

In another aspect of the present disclosure, an integrated sensor-lens assembly for an image capture apparatus is disclosed. The integrated sensor-lens assembly defines an optical axis and includes a printed circuit board and a lens holder. The lens holder is fixed in relation to the printed circuit board via an adherent and is configured such that the adherent is spaced from the printed circuit board along the optical axis in order to allow for UV curing thereof.

In another aspect of the present disclosure, an integrated sensor-lens assembly for an image capture apparatus is disclosed. The integrated sensor-lens assembly defines an optical axis and includes: a first component; a second component that is secured to the first component at a first interface; and a third component that is secured to the second component at a second interface, whereby the second interface is spaced from the first component along the optical axis.

In certain embodiments, the second component may be secured to the first component by a first adherent.

In certain embodiments, the third component may be secured to the second component by a second adherent that is different than the first adherent.

In certain embodiments, the second adherent may be UV curable.

BRIEF DESCRIPTION OF THE DRAWINGS

The present disclosure is best understood from the following detailed description when read in conjunction with the accompanying drawings. According to common practice, the various features of the drawings may not be to-scale, and the dimensions of the various features may be arbitrarily expanded or reduced. Additionally, in the interest of clarity, certain components, elements, and/or features may be omitted from certain drawings in the interest of clarity.

DETAILED DESCRIPTION

The present disclosure describes various embodiments of integrated sensor-lens assemblies (ISLAs) for an image capture apparatus. For example, in one embodiment, the ISLA includes a lens holder; a cover glass holder that is secured (connected) to the lens holder; and a printed circuit board that is secured (connected) to the cover glass holder such that the cover glass holder is located between, and indirectly connects, the lens holder and the printed circuit board.

Figure 1A:
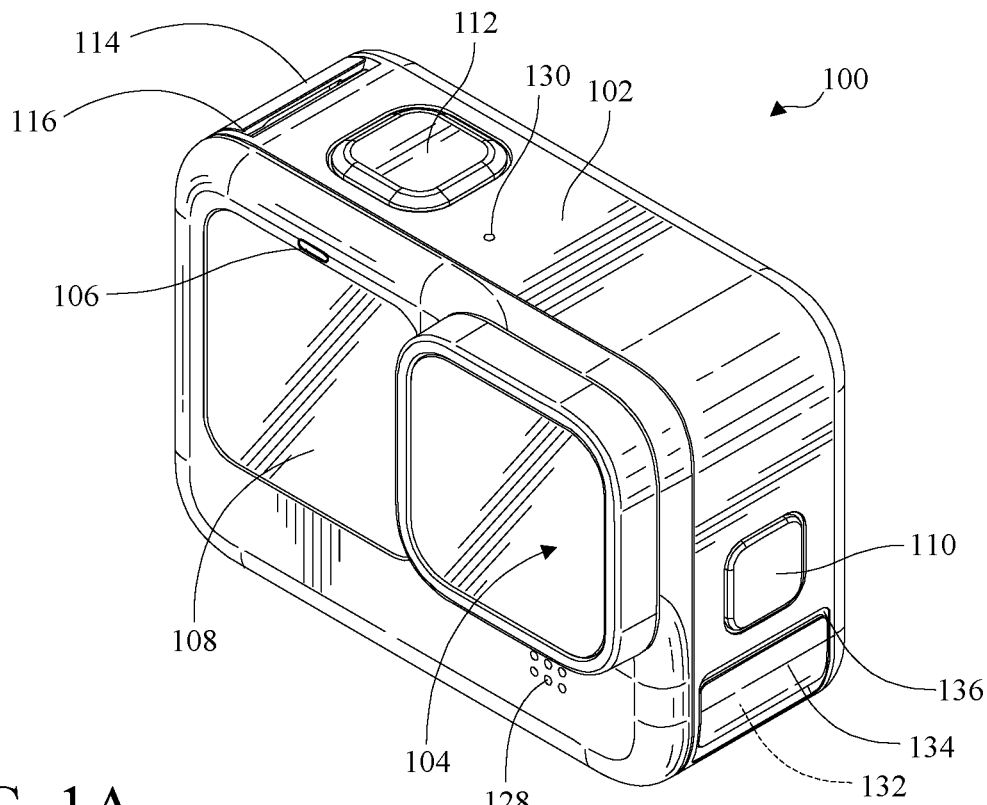
FIGS. 1A-B are isometric views of an example of an image capture apparatus.
Figure 1B:
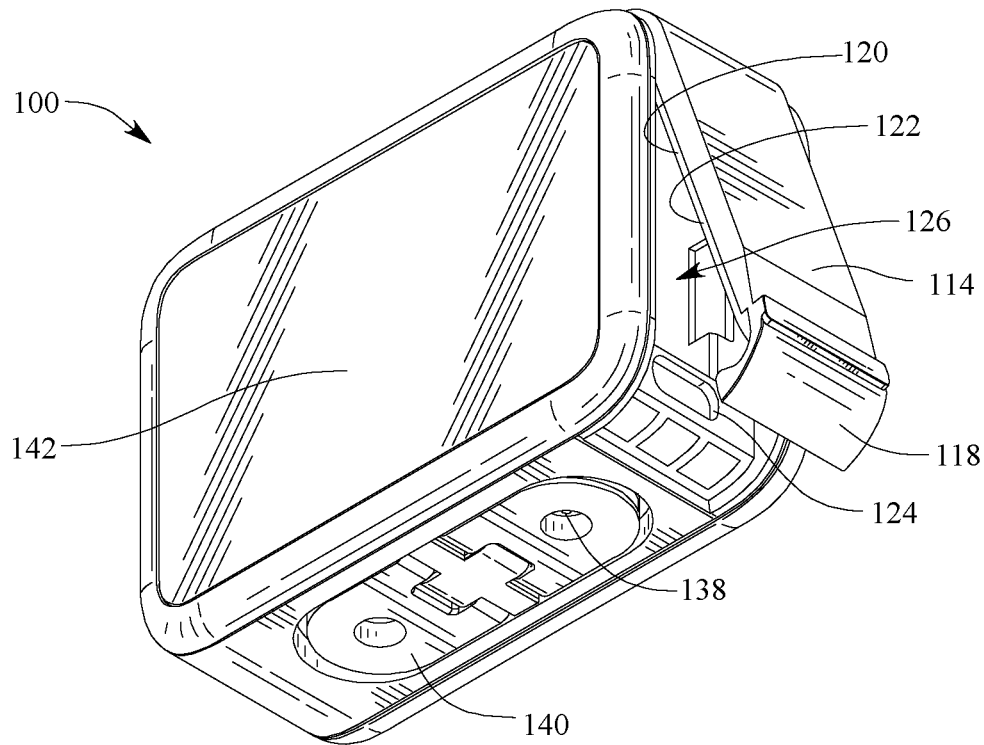

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-B, the image capture apparatus 100 includes internal electronics, such as imaging electronics, power electronics, and the like, internal to the body 102 for capturing images and performing other functions of the image capture apparatus 100. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured (connected) to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptable 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
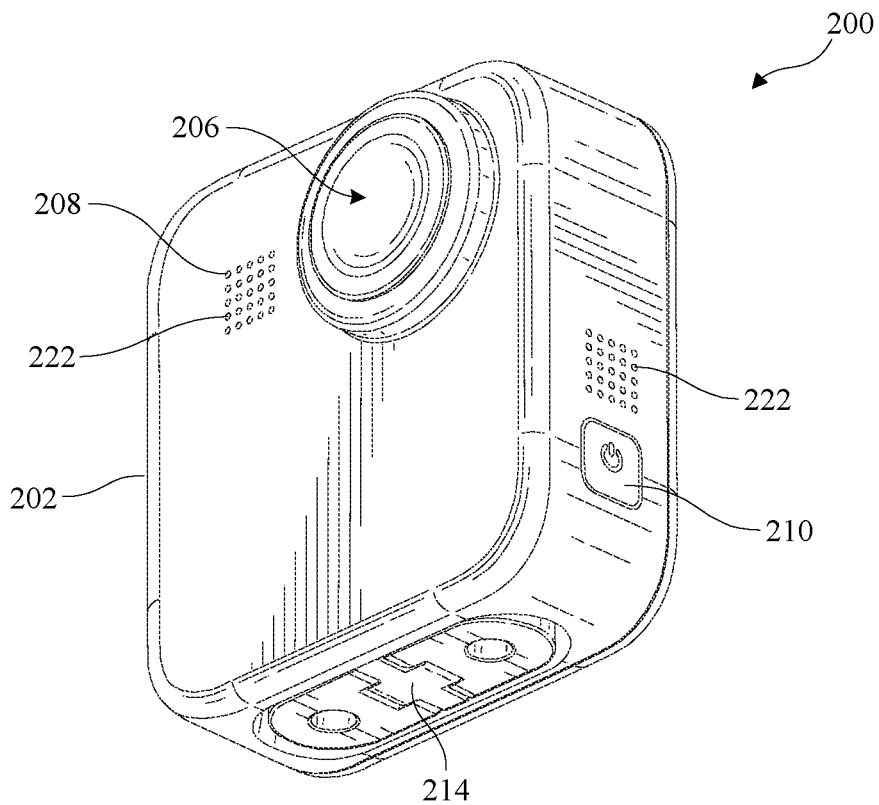
FIGS. 2A-B are isometric views of another example of an image capture apparatus.
Figure 2B:
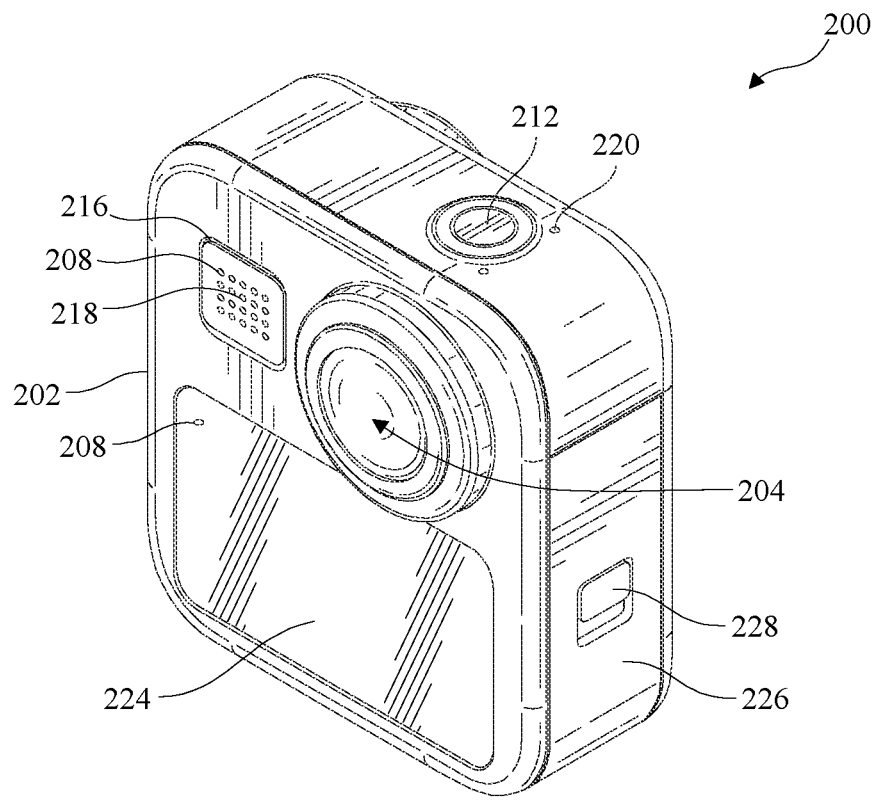

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

Figure 4:
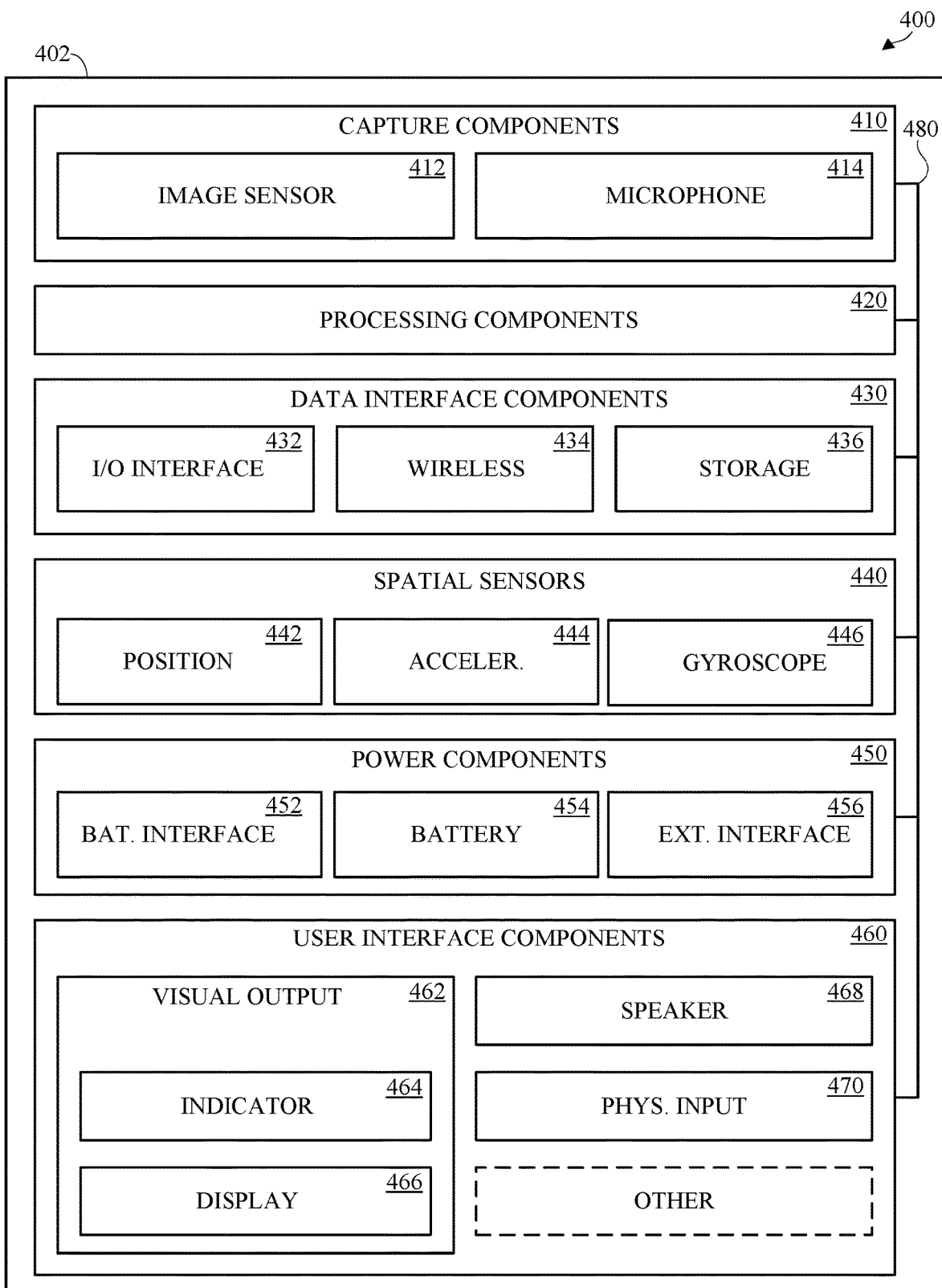
FIG. 4 is a block diagram of electronic components of an image capture apparatus.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 4.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
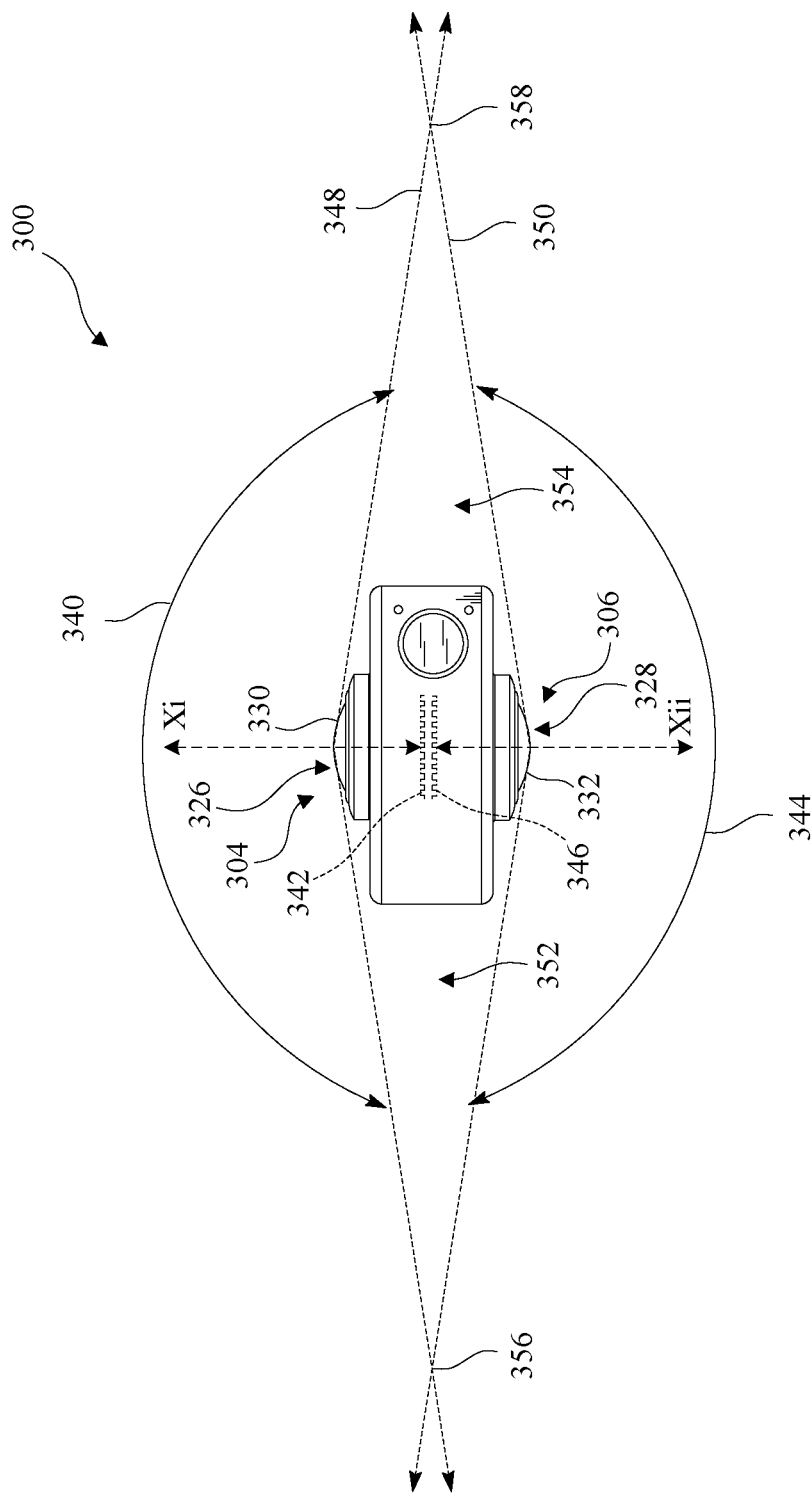
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342. In the illustrated embodiment, the first lens 330 and the first image sensor 342 are integrated into a single unit, whereby the first image capture device 304 is configured as a first ISLA 326 that defines a first optical axis Xi.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346. In the illustrated embodiment, the second lens 332 and the second image sensor 346 are integrated into a single unit, whereby the second image capture device 306 is configured as a second ISLA 328 that defines a second optical axis Xii.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions (e.g., a forward direction and a rearward direction), and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The ISLAs 326, 328 (e.g., the lenses 330, 332) may be aligned as shown (e.g., such that the optical axes Xi, Xii are coincident with each other), laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

FIG. 4 is a block diagram of electronic components in an image capture apparatus 400. The image capture apparatus 400 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-B, the image capture apparatus 200 shown in FIGS. 2A-B, or the image capture apparatus 300 shown in FIG. 3, may be implemented as shown in FIG. 4.

The image capture apparatus 400 includes a body 402. The body 402 may be similar to the body 102 shown in FIGS. 1A-1B or the body 202 shown in FIGS. 2A-2B. The body 402 includes electronic components such as capture components 410, processing components 420, data interface components 430, spatial sensors 440, power components 450, user interface components 460, and a bus 480.

The capture components 410 include an image sensor 412 for capturing images. Although one image sensor 412 is shown in FIG. 4, the capture components 410 may include multiple image sensors. The image sensor 412 may be similar to the image sensors 342, 346 shown in FIG. 3. The image sensor 412 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 412 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 412 captures detected light as image data and conveys the captured image data as electrical signals (image signals or image data) to the other components of the image capture apparatus 400, such as to the processing components 420, such as via the bus 480.

The capture components 410 include a microphone 414 for capturing audio. Although one microphone 414 is shown in FIG. 4, the capture components 410 may include multiple microphones. The microphone 414 detects and captures, or records, sound, such as sound waves incident upon the microphone 414. The microphone 414 may detect, capture, or record sound in conjunction with capturing images by the image sensor 412. The microphone 414 may detect sound to receive audible commands to control the image capture apparatus 400. The microphone 414 may be similar to the microphones 128, 130, 132 shown in FIGS. 1A-1B or the audio components 218, 220, 222 shown in FIGS. 2A-2B.

The processing components 420 perform image signal processing, such as filtering, tone mapping, or stitching, to generate, or obtain, processed images, or processed image data, based on image data obtained from the image sensor 412. The processing components 420 may include one or more processors having single or multiple processing cores. In some implementations, the processing components 420 may include, or may be, an application specific integrated circuit (ASIC) or a digital signal processor (DSP). For example, the processing components 420 may include a custom image signal processor. The processing components 420 conveys data, such as processed image data, with other components of the image capture apparatus 400 via the bus 480. In some implementations, the processing components 420 may include an encoder, such as an image or video encoder that may encode, decode, or both, the image data, such as for compression coding, transcoding, or a combination thereof.

Although not shown expressly in FIG. 4, the processing components 420 may include memory, such as a random-access memory (RAM) device, which may be non-transitory computer-readable memory. The memory of the processing components 420 may include executable instructions and data that can be accessed by the processing components 420.

The data interface components 430 communicates with other, such as external, electronic devices, such as a remote control, a smartphone, a tablet computer, a laptop computer, a desktop computer, or an external computer storage device. For example, the data interface components 430 may receive commands to operate the image capture apparatus 400. In another example, the data interface components 430 may transmit image data to transfer the image data to other electronic devices. The data interface components 430 may be configured for wired communication, wireless communication, or both. As shown, the data interface components 430 include an I/O interface 432, a wireless data interface 434, and a storage interface 436. In some implementations, one or more of the I/O interface 432, the wireless data interface 434, or the storage interface 436 may be omitted or combined.

The I/O interface 432 may send, receive, or both, wired electronic communications signals. For example, the I/O interface 432 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 432 is shown in FIG. 4, the data interface components 430 include multiple I/O interfaces. The I/O interface 432 may be similar to the data interface 124 shown in FIG. 1B.

The wireless data interface 434 may send, receive, or both, wireless electronic communications signals. The wireless data interface 434 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 434 is shown in FIG. 4, the data interface components 430 include multiple wireless data interfaces. The wireless data interface 434 may be similar to the data interface 124 shown in FIG. 1B.

The storage interface 436 may include a memory card connector, such as a memory card receptacle, configured to receive and operatively couple to a removable storage device, such as a memory card, and to transfer, such as read, write, or both, data between the image capture apparatus 400 and the memory card, such as for storing images, recorded audio, or both captured by the image capture apparatus 400 on the memory card. Although one storage interface 436 is shown in FIG. 4, the data interface components 430 include multiple storage interfaces. The storage interface 436 may be similar to the data interface 124 shown in FIG. 1B.

The spatial, or spatiotemporal, sensors 440 detect the spatial position, movement, or both, of the image capture apparatus 400. As shown in FIG. 4, the spatial sensors 440 include a position sensor 442, an accelerometer 444, and a gyroscope 446. The position sensor 442, which may be a global positioning system (GPS) sensor, may determine a geospatial position of the image capture apparatus 400, which may include obtaining, such as by receiving, temporal data, such as via a GPS signal. The accelerometer 444, which may be a three-axis accelerometer, may measure linear motion, linear acceleration, or both of the image capture apparatus 400. The gyroscope 446, which may be a three-axis gyroscope, may measure rotational motion, such as a rate of rotation, of the image capture apparatus 400. In some implementations, the spatial sensors 440 may include other types of spatial sensors. In some implementations, one or more of the position sensor 442, the accelerometer 444, and the gyroscope 446 may be omitted or combined.

The power components 450 distribute electrical power to the components of the image capture apparatus 400 for operating the image capture apparatus 400. As shown in FIG. 4, the power components 450 include a battery interface 452, a battery 454, and an external power interface 456 (ext. interface). The battery interface 452 (bat. interface)

operatively couples to the battery 454, such as via conductive contacts to transfer power from the battery 454 to the other electronic components of the image capture apparatus 400. The battery interface 452 may be similar to the battery receptacle 126 shown in FIG. 1B. The external power interface 456 obtains or receives power from an external source, such as a wall plug or external battery, and distributes the power to the components of the image capture apparatus 400, which may include distributing power to the battery 454 via the battery interface 452 to charge the battery 454. Although one battery interface 452, one battery 454, and one external power interface 456 are shown in FIG. 4, any number of battery interfaces, batteries, and external power interfaces may be used. In some implementations, one or more of the battery interface 452, the battery 454, and the external power interface 456 may be omitted or combined. For example, in some implementations, the external interface 456 and the I/O interface 432 may be combined.

The user interface components 460 receive input, such as user input, from a user of the image capture apparatus 400, output, such as display or present, information to a user, or both receive input and output information, such as in accordance with user interaction with the image capture apparatus 400.

As shown in FIG. 4, the user interface components 460 include visual output components 462 to visually communicate information, such as to present captured images. As shown, the visual output components 462 include an indicator 464 and a display 466. The indicator 464 may be similar to the indicator 106 shown in FIG. 1A or the indicators 208 shown in FIGS. 2A-2B. The display 466 may be similar to the display 108 shown in FIG. 1A, the display 142 shown in FIG. 1B, or the display 224 shown in FIG. 2B. Although the visual output components 462 are shown in FIG. 4 as including one indicator 464, the visual output components 462 may include multiple indicators. Although the visual output components 462 are shown in FIG. 4 as including one display 466, the visual output components 462 may include multiple displays. In some implementations, one or more of the indicators 464 or the display 466 may be omitted or combined.

As shown in FIG. 4, the user interface components 460 include a speaker 468. The speaker 468 may be similar to the speaker 138 shown in FIG. 1B or the audio components 218, 220, 222 shown in FIGS. 2A-2B. Although one speaker 468 is shown in FIG. 4, the user interface components 460 may include multiple speakers. In some implementations, the speaker 468 may be omitted or combined with another component of the image capture apparatus 400, such as the microphone 414.

As shown in FIG. 4, the user interface components 460 include a physical input interface 470. The physical input interface 470 may be similar to the mode buttons 110, 210 shown in FIGS. 1A, 2A or the shutter buttons 112, 212 shown in FIGS. 1A, 2B. Although one physical input interface 470 is shown in FIG. 4, the user interface components 460 may include multiple physical input interfaces. In some implementations, the physical input interface 470 may be omitted or combined with another component of the image capture apparatus 400. The physical input interface 470 may be, for example, a button, a toggle, a switch, a dial, or a slider.

As shown in FIG. 4, the user interface components 460 include a broken line border box labeled "other" to indicate that components of the image capture apparatus 400 other than the components expressly shown as included in the user interface components 460 may be user interface components. For example, the microphone 414 may receive, or capture, and process audio signals to obtain input data, such as user input data corresponding to voice commands. In another example, the image sensor 412 may receive, or capture, and process image data to obtain input data, such as user input data corresponding to visible gesture commands. In another example, one or more of the spatial sensors 440, such as a combination of the accelerometer 444 and the gyroscope 446, may receive, or capture, and process motion data to obtain input data, such as user input data corresponding to motion gesture commands.

Figure 5:
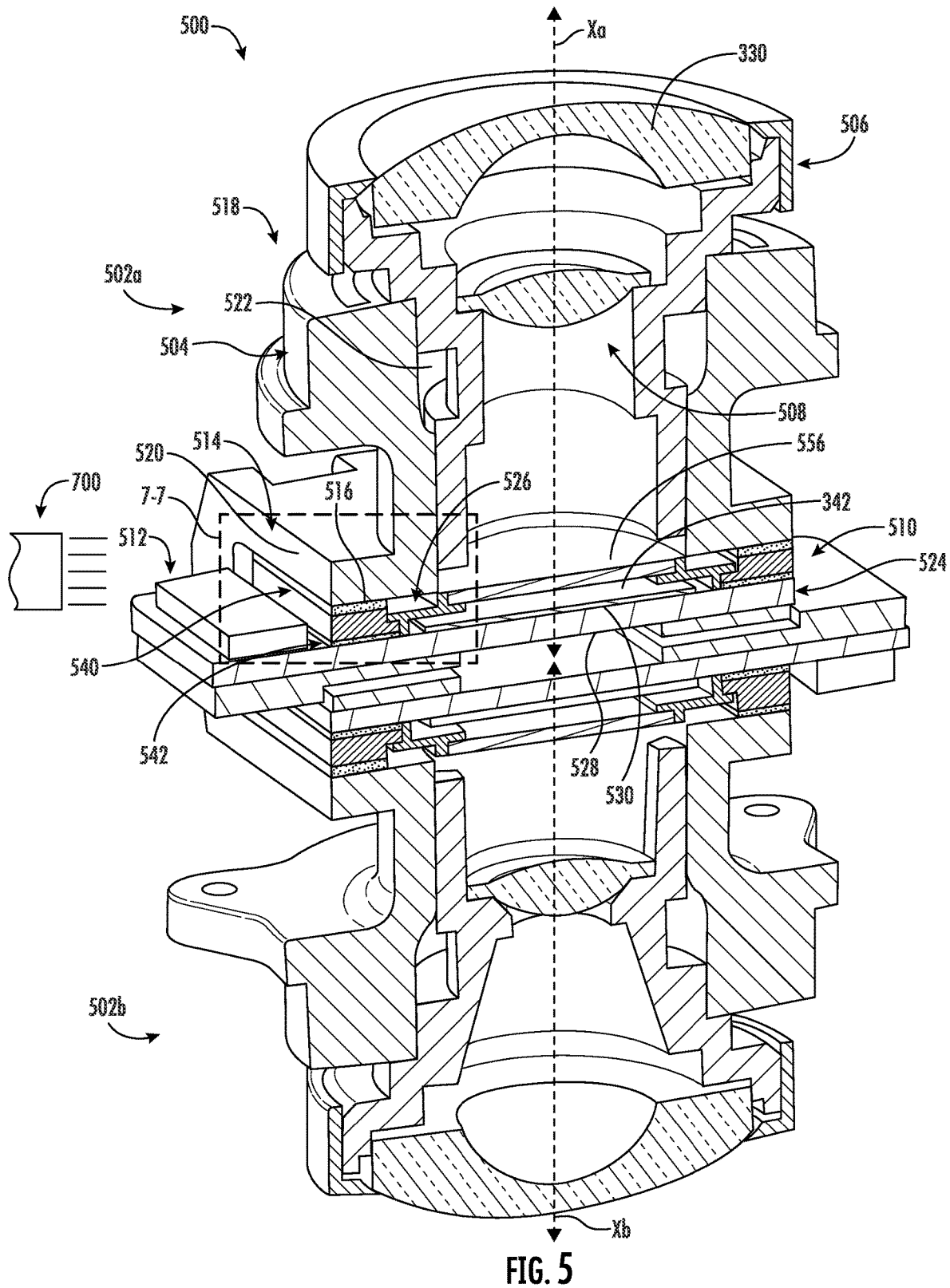
FIG. 5 is a perspective, cross-sectional view of an example of an optical module for an image capture apparatus including a pair of ISLAs.
Figure 6:
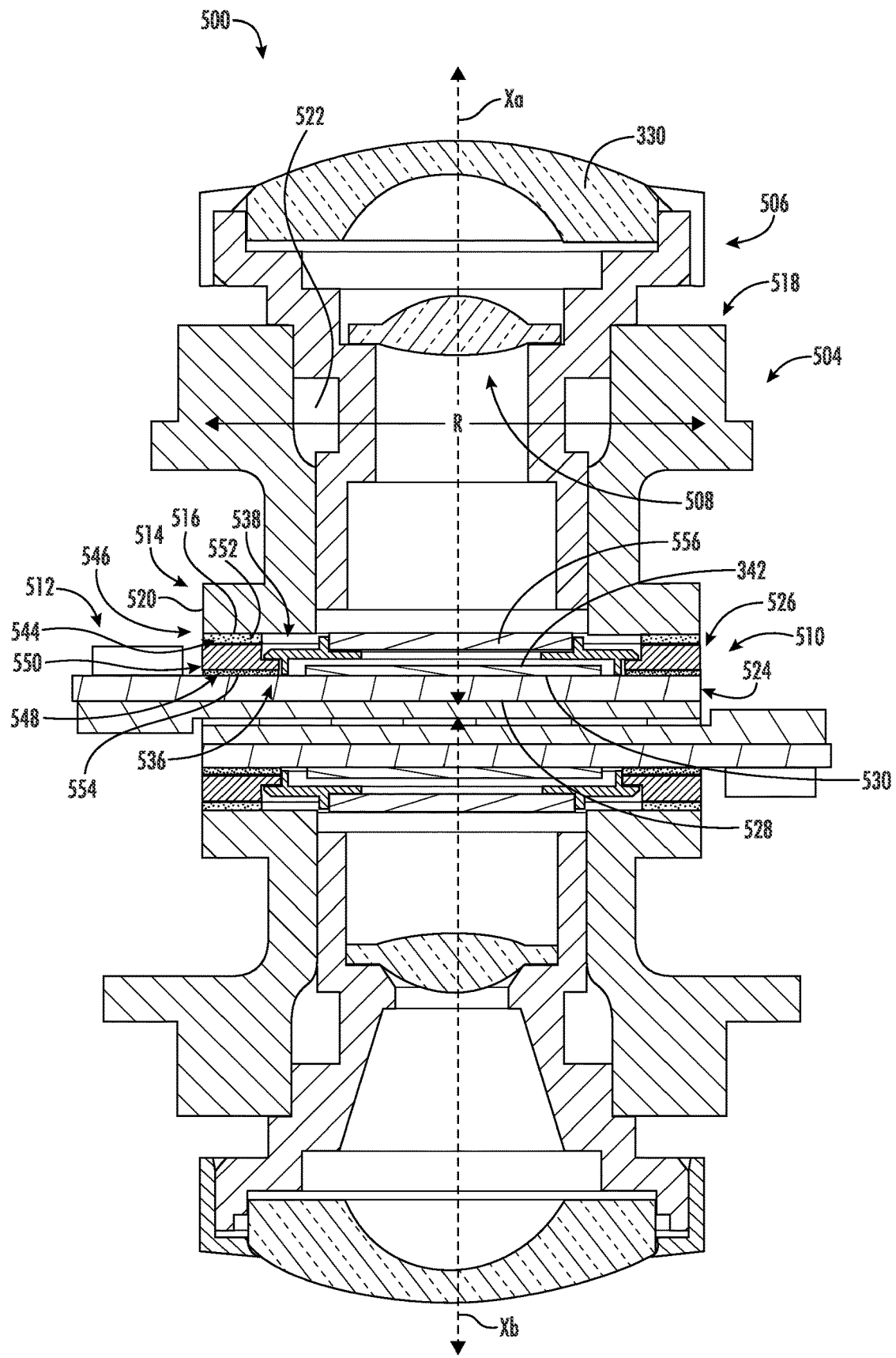
FIG. 6 is an axial (longitudinal) cross-sectional view of the optical module seen in FIG. 5.
Figure 7:
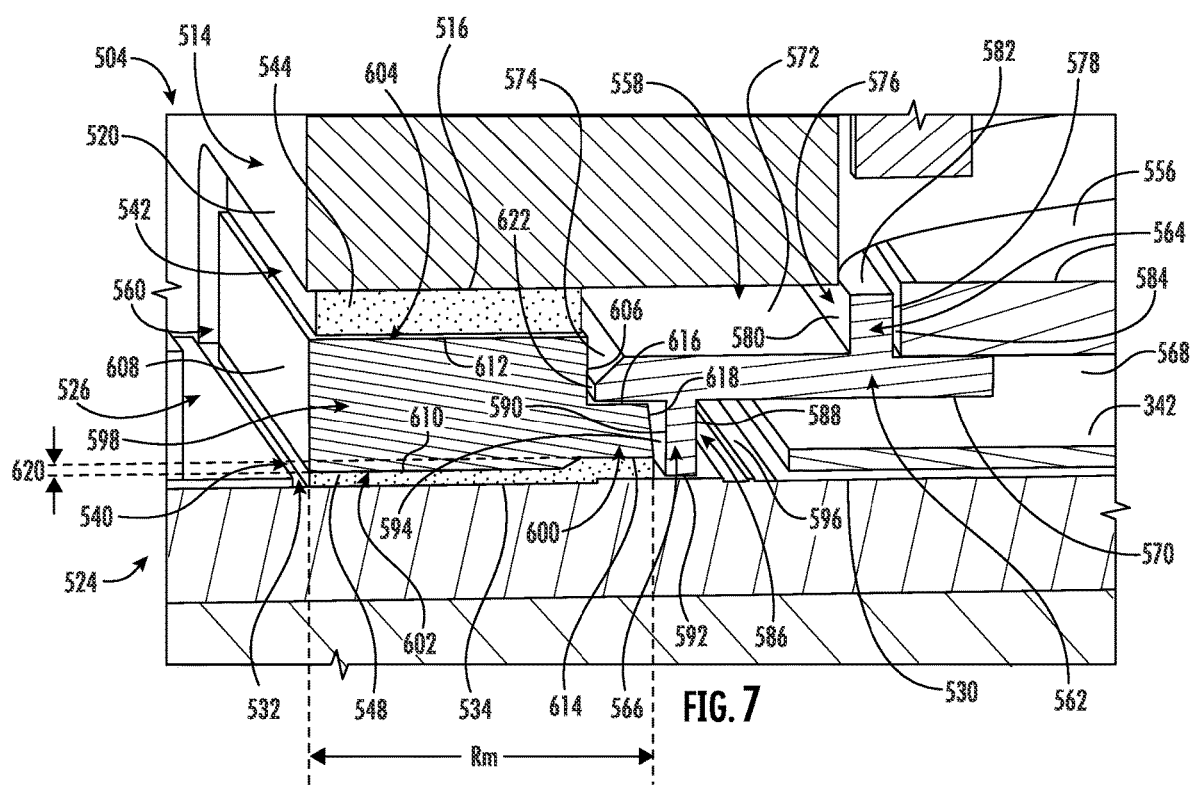
FIG. 7 is an enlargement of the area of detail identified in FIG. 5.

With reference now to FIGS. 5-7, an optical module 500 will be discussed, which may be configured for use with any of the aforedescribed spherical image capture apparatuses (e.g., the image capture apparatus 200 (FIGS. 2A, 2B), the image capture apparatus 300 (FIG. 3), etc.). More specifically, FIG. 5 is a perspective, cross-sectional view of the optical module 500; FIG. 6 is an axial (longitudinal) cross-sectional view of the optical module 500; and FIG. 7 is an enlargement of the area of detail identified in FIG. 5.

The optical module 500 includes respective first and second ISLAs 502a, 502b, which define respective optical axes Xa, Xb and are similar (e.g., (generally) identical) in configuration. As such, throughout the following disclosure, only the ISLA 502a will be described in detail. The ISLAs 502a, 502b include components and features that are similar to those discussed above in connection with the aforedescribed ISLAs 326, 328 (FIG. 3) and, accordingly, will only be discussed with respect to differences therefrom in the interest of brevity. Identical reference characters will thus be utilized to refer to elements, structures, features, etc., common to the ISLAs 326, 328, 502.

Although generally illustrated in the context of a spherical image capture apparatus in which the ISLAs 502a, 502b are (generally) aligned (e.g., such that the respective optical axes Xa, Xb are (generally) coincident), embodiments are also envisioned in which the optical module 500 may be configured such that the ISLAs 502a, 502b are misaligned (e.g., such that the respective optical axes Xa, Xb are offset from each other). Embodiments in which a single ISLA 502 may be utilized in a non-spherical image capture apparatus, such as the image capture apparatus 100 (FIGS. 1A, 1B), for example, are also envisioned herein and would not be beyond the scope of the present disclosure.

Each ISLA 502 includes: a lens holder (mount) 504; a lens barrel 506, which houses (includes, accommodates) an optical group 508 that includes the lens 330 and receives and directs light onto the image sensor 342; a printed circuit board (PCB) subassembly 510 that is secured (connected) to the lens holder 504; and an electrical connector 512.

The lens holder 504 has an inner end 514, which defines an inner mounting surface 516, and an outer end 518. The lens holder 504 defines an outer radial wall 520, which extends in (generally) parallel relation to the optical axis X thereof (e.g., the optical axis Xa defined by the ISLA 502a and the optical axis Xb defined by the ISLA 502b), and an internal chamber 522, which extends between the ends 514, 518 thereof and is configured to receive the lens barrel 506 such that the lens barrel 506 protrudes from the outer end 518.

The lens barrel 506 is located within, and is secured (connected) to, the lens holder 504 (e.g., concentrically within the internal chamber 522) such that the lens barrel 506 and, thus, the optical group 508 are fixed in relation thereto. For example, it is envisioned that the lens barrel 506 may be adhesively secured (connected) to the lens holder 504 and/or that the lens barrel 506 may be mechanically secured (connected) to the lens holder 504 (e.g., via one or more mechanical fasteners).

The PCB subassembly 510 includes: a printed circuit board (PCB) 524 and a cover glass holder 526.

The PCB 524 has an inner face 528 and an outer face 530. The outer face 530 supports the image sensor 342 and defines a channel 532 (FIG. 7) that extends into the outer face 530 in (generally) parallel relation to the optical axis X so as to define an outer mounting surface 534.

The cover glass holder 526 has respective inner and outer ends 536, 538 (FIG. 6) and is secured (connected) to both the lens holder 504 and the PCB 524 at respective first and second interfaces 540, 542 (FIG. 5), which are spaced axially from each other along the optical axis X. The cover glass holder 526 is thus located between, and indirectly connects, the lens holder 504 and the PCB 524 such that the lens holder 504 and the PCB 524 are spaced axially from each other along the optical axis X and are devoid of any direct connection. More specifically, the outer end 538 of the cover glass holder 526 is secured (connected) to the inner end 514 of the lens holder 504 by a (first) adherent 544 located therebetween so as to define a (first) joint 546, which is subjected to UV and thermal curing processes, as described in further detail below, and the inner end 536 of the cover glass holder 526 is secured (connected) to the outer face 530 of the PCB 524 by a (second) adherent 548 located therebetween so as to define a (second) joint 550, which is subjected to a standard curing process (e.g., air curing). For example, in certain embodiments, it is envisioned that the adherent 544 may include an active alignment adhesive 552, whereas the adherent 548 may include a standard adhesive 554, a solder, or any other such suitable means of securing (connecting) the cover glass holder 526 to the PCB 524. The adherents 544, 548 thus differ from each other in not only composition, but in the processes by which they are cured.

Figure 8:
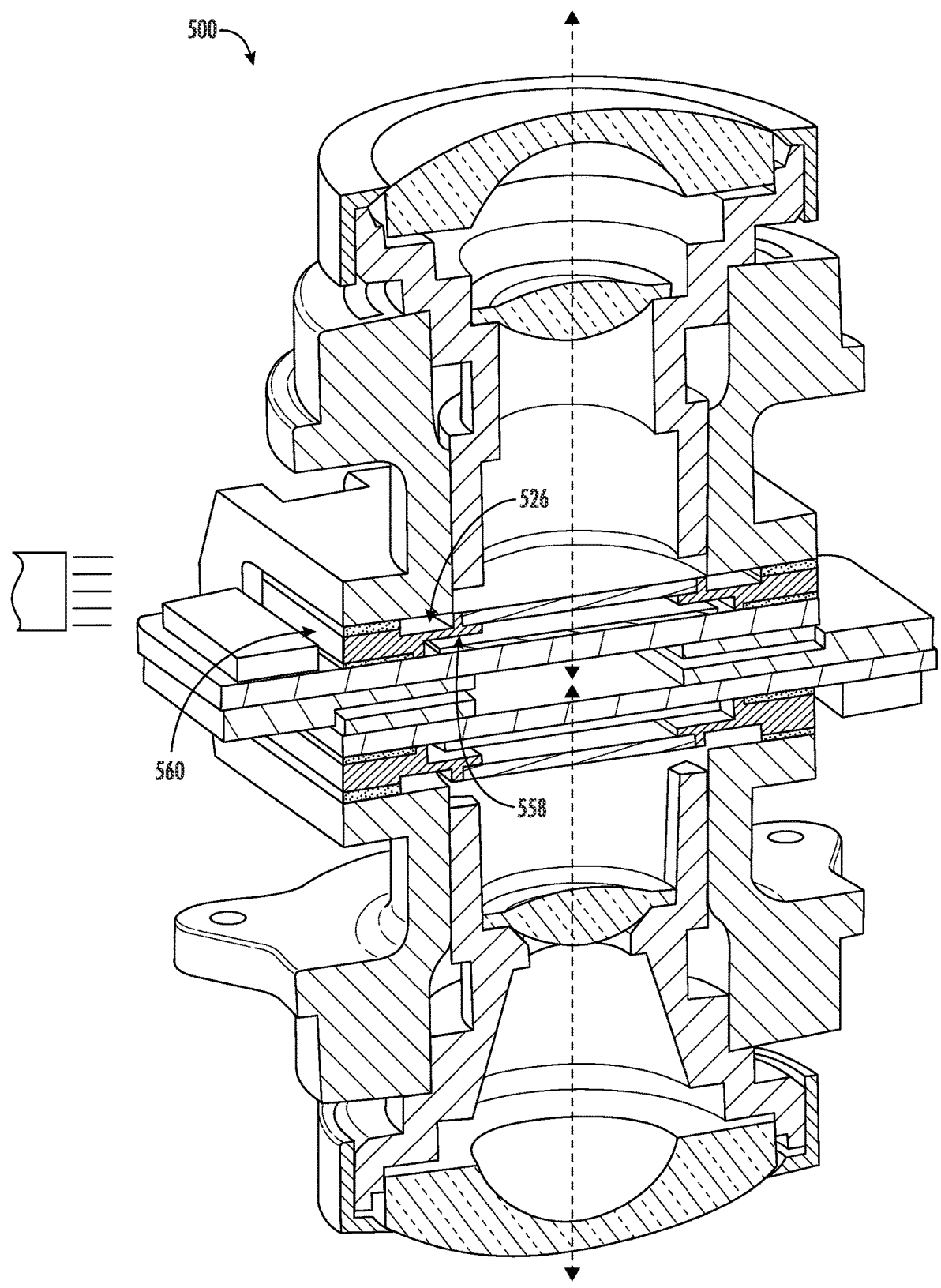
FIG. 8 is a perspective, cross-sectional view of another example of an optical module for an image capture apparatus including a pair of ISLAs.

The cover glass holder 526 supports a cover glass 556, which protects the image sensor 342 from particles, debris, dust, etc., and acts as an optical filter for the ISLA 502. With reference now to FIG. 7 in particular, the cover glass holder 526 includes an inner module (component) 558 and an outer module (component) 560 that is connected to the inner module 558. In the illustrated embodiment, the modules 558, 560 are configured as discrete components of the cover glass holder 526 that include (e.g., are formed from) different (dissimilar) (e.g., respective first and second) materials of construction, which may be connected (secured) together in any suitable manner (e.g., via an adhesive, welding, etc.). For example, it is envisioned that the inner module 558 may include (e.g., may be formed partially or entirely from) a polyamide (e.g., PA9T) and that the outer module 560 may include (e.g., may be formed partially or entirely from) liquid crystal polymer. Embodiments in which the modules 558, 560 may include similar (e.g., identical) materials of construction are also envisioned herein, however, as are embodiments in which the cover glass holder 526 may be unitary in construction. For example, FIG. 8 is a perspective, cross-sectional view of an alternate embodiment of the optical module 500 in which the modules 558, 560 are integrally (monolithically) formed (e.g., via injection molding from a common material) such that the cover glass holder 526 includes a single-piece construction.

The inner module 558 includes: a base 562; an inner ring 564; and an outer ring 566. As described in further detail below, the inner module 558 is positioned about (e.g., circumscribes) the image sensor 342 and supports the cover glass 556 such that the inner module 558 and the cover glass 556 overlie the image sensor 342.

The base 562 extends in (generally) orthogonal (perpendicular) relation to the optical axis X and includes an aperture 568 that is (generally) aligned with optical group 508 (FIGS. 5, 6) and the image sensor 342 in order to allow for light entering the lens barrel 506 to be directed onto the image sensor 342. The base 562 defines respective inner and outer end walls 570, 572, each of which extends in (generally) orthogonal (perpendicular) relation to the optical axis X, and an outer radial wall 574. In the illustrated embodiment, the outer radial wall 574 is chamfered (beveled) such that the outer radial wall 574 extends at an acute angle in relation to the optical axis X, which facilitates assembly of the ISLA 502 (e.g., by reducing tolerances). Embodiments of the inner module 558 in which the outer radial wall 574 may instead extend in (generally) parallel relation to the optical axis X are also envisioned herein, however, and would not be beyond the scope of the present disclosure.

The inner ring 564 is defined by a (generally) annular (first) flange 576 that extends axially outward from the base 562 (e.g., away from the PCB 524) in (generally) parallel relation to the optical axis X so as to define respective inner and outer radial walls 578, 580, each of which extends in (generally) parallel relation to the optical axis X, and an outer end wall 582, which extends in (generally) orthogonal (perpendicular) relation to the optical axis X. The flange 576 is inset in relation to, and is spaced radially outward from, the aperture 568 (e.g., with respect to the optical axis X) so as to define a (first) receptacle 584 that is configured to receive the cover glass 556. More specifically, upon assembly of the ISLA 502, the cover glass 556 is positioned adjacent to (e.g., in contact with) the inner radial wall 578 of the flange 576, whereby the cover glass 556 nests within the inner module 558 (e.g., the receptacle 584) and overlies the image sensor 342 such that the cover glass 556 is spaced axially therefrom along the optical axis X.

The outer ring 566 is defined by a (generally) annular (second) flange 586 that extends axially inward from the base 562 (e.g., towards the PCB 524) in (generally) parallel relation to the optical axis X and the flange 576 so as to define respective inner and outer radial walls 588, 590, each of which extends in (generally) parallel relation to the optical axis X, and an inner end wall 592, which extends in (generally) orthogonal (perpendicular) relation to the optical axis X. The flange 586 is inset in relation to, and is spaced radially inward from, the outer radial wall 574 of the base 562 so as to define a (second) receptacle 594 and a recess 596. The receptacle 594 is configured to (partially) receive the outer module 560 such that the base 562 overlies the outer module 560, and the recess 596 is configured to accommodate (receive, house) the image sensor 342 such that the outer ring 566 circumscribes the image sensor 342. As seen in FIG. 7, upon assembly of the ISLA 502, the inner end wall 592 defined by the flange 586 is positioned adjacent to (e.g., in contact with) the PCB 524 radially inward of the channel 532.

The outer module 560 includes a body 598 and a tooth 600. As described in further detail below, the outer module 560 is positioned about (e.g., circumscribes) the inner module 558 and, thus, the image sensor 342, and supports assembly of the ISLA 502 by providing sufficient surface area to establish the interfaces 540, 542.

The body 598 defines respective inner and outer end walls 602, 604, each of which extends in (generally) orthogonal (perpendicular) relation to the optical axis X, and respective inner and outer radial walls 606, 608, each of which extends in (generally) parallel relation to the optical axis X. The inner and outer end walls 602, 604 define respective inner and outer mounting surfaces 610, 612, which support the application of the adherents 544, 548, respectively. More specifically, the inner mounting surface 610 faces (is oriented towards) the PCB 524 and supports application of the adherent 548 so as to define the interface 542, and the outer mounting surface 612 faces (is oriented towards) the inner mounting surface 516 defined by the inner end 514 of the lens holder 504 and supports application of the adherent 544 so as to define the interface 540. As seen in FIG. 7, upon assembly of the ISLA 502, the inner radial wall 606 of the body 598 is positioned adjacent to (e.g., in contact with) the outer radial wall 574 of the base 562, and the outer radial wall 608 of the body 598 is (generally) aligned with the outer radial wall 520 of the lens holder 504.

The lens holder 504, the cover glass holder 526, and the PCB 524 are arranged axially in an end-to-end, stacked configuration along the optical axis X, whereby the mounting surfaces 516, 612, 610, 534 extend in (generally) parallel relation to each other and in (generally) orthogonal (perpendicular) relation to the optical axis X, with the mounting surfaces 516, 612 and the mounting surfaces 610, 534 being oriented in facing relation. The stacked configuration of the ISLA 502 and the resulting (generally) orthogonal (perpendicular) orientations of the mounting surfaces 516, 612, 610, 534 in relation to the optical axis X eliminates radial adjacency of the lens holder 504, the cover glass holder 526, and the PCB 524, which allows for the elimination of radial gaps that may otherwise be required in order to (adhesively) secure (connect) the components of the ISLA 502, as in known ISLAs, thereby reducing an overall radial dimension R of the ISLA 502. For example, in the illustrated embodiment, the ISLA 502 is configured such that the radial dimension R lies (substantially) within the range of (approximately) 13.8 mm to (approximately) 15.7 mm, which is a reduction of (approximately) 7% from known ISLAs. Additionally, the stacked configuration of the ISLA 502 described herein increases not only the amount of internal space available (e.g., on the outer face 530 of the PCB 524) for fasteners, electrical connectors, lightpipes, indicators, wiring, surface mounts, sensors, etc., but accessibility of the mounting surfaces 516, 612, which facilitates stencil (screen) printing of the adherent 544, rather than dispensation via a needle (or other such apparatus), as is typical during the assembly of an ISLA.

With continued reference to FIG. 7, the body 598 is configured for insertion into (reception by) the channel 532 such that the outer module 560 nests within the PCB 524. Nesting of the outer module 560 and the PCB 524 not only supports assembly of the ISLA 502, but inhibits (if not entirely prevents) undesirable (radial) movement between the cover glass holder 526 and the PCB 524 (e.g., during curing of the adherents 544, 548). More specifically, nesting of the outer module 560 and the PCB 524 facilitates proper alignment of the cover glass holder 526 with the PCB 524, the image sensor 342, and the lens holder 504, and, thus, active alignment of the optical group 508 (FIGS. 5, 6) and the image sensor 342. Nesting of the outer module 560 and the PCB 524 also inhibits (if not entirely prevents) undesirable (radial) movement between the cover glass holder 526 and the PCB 524, which increases uniformity in the cure of the joints 546, 550 in order to mitigate any misalignment between the optical group 508 and the image sensor 342 that might otherwise occur.

The tooth 600 extends radially inward from the body 598 (e.g., towards the inner module 558) and is inset in relation to, and is spaced axially from, both the inner end wall 602 and the outer end wall 604 of the body 598 along the optical axis X so as to define respective inner and outer end walls 614, 616, which extend in (generally) orthogonal (perpendicular) relation to the optical axis X, and an inner radial wall 618, which extends in (generally) parallel relation to the optical axis X. More specifically, the tooth 600 is spaced axially from the inner end wall 602 of the body 598 so as to define a gap 620 that accommodates reception of the body 598 within the channel 532 in the PCB 524, and the tooth 600 is spaced axially from the outer end wall 604 of the body 598 so as to define a receptacle 622 that is configured to (partially) receive the inner module 558 such that the inner module 558 nests within the outer module 560. As seen in FIG. 7, upon assembly of the ISLA 502, the inner end wall 614 of the tooth 600 is positioned adjacent to (e.g., in contact with) the PCB 524, the outer end wall 616 of the tooth 600 is positioned adjacent to (e.g., in contact with) the inner end wall 570 of the base 562 of the inner module 558, and the inner radial wall 618 of the tooth 600 is positioned adjacent to (e.g., in contact with) the outer radial wall 590 of the flange 586.

As indicated above, it is envisioned that the inner module 558 and the outer module 560 may be secured (connected) together in any suitable manner. In the illustrated embodiment, the modules 558, 560 are connected by applying an adherent (not shown) therebetween, which may be the same as the adherent 548 used to secure (connect) the inner end 536 of the cover glass holder 526 to the outer face 530 of the PCB 524. More specifically, the adherent is applied to the interface between the outer radial wall 590 and the inner radial wall 618, to the interface between the inner end wall 570 and the outer end wall 616, and/or to the interface between the outer radial wall 574 and the inner radial wall 606.

As seen in FIG. 7, the outer module 560 defines a radial dimension Rm (e.g., a width) that lies (substantially) within the range of (approximately) 1 mm to (approximately) 2 mm, which increases not only the surface area available for the adherents 544, 548, but the structural support provided by the cover glass holder 526 when compared to known ISLAs, which typically define a corresponding radial dimension that lies (substantially) within the range of (approximately) 0.25 mm to (approximately) 0.5 mm. As such, in contrast to the optical modules utilized in known image capture apparatuses, the cover glass holder 526 serves as a structural component of the ISLA 502 that increases the overall strength and stability thereof.

With reference again to FIGS. 5 and 6, the electrical connector 512 is supported by (connected to) the PCB 524 and is spaced (located, positioned) radially outward from the cover glass holder 526 (e.g., with respect to the optical axis X). More specifically, the electrical connector 512 is (generally) aligned with the interface 542 (e.g., the joint 550) and is spaced axially from the interface 540 (e.g., the joint 546) along the optical axis X, which facilitates access (e.g., direct line-of-sight) to the interface 540 during UV curing, as described in further detail below. The electrical connector 512 may be any component (or array of components) that supports functionality of the ISLA 502 and/or the image capture apparatus (e.g., the image capture apparatuses 200, 300) including, for example, one or more connectors, ports, hubs, interfaces, surface mounts, or the like, and may be connected to the PCB 524 in any suitable manner. For example, it is envisioned that the electrical connector 512 may be adhesively secured (connected) to the PCB 524 and/or that the electrical connector 512 may be mechanically secured (connected) to the PCB 524 (e.g., via one or more mechanical fasteners).

With continued reference to FIGS. 5-7, a method of assembling the ISLA 502 will be discussed.

Initially, the cover glass holder 526 is assembled by (adhesively) connecting the inner module 558 and the outer module 560.

The electrical connector 512 can then be connected to the PCB 524, after which, the lens holder 504 is actively aligned with the assembled cover glass holder 526. Active alignment of the lens holder 504 and the cover glass holder 526 results in corresponding active alignment of the optical group 508 and the image sensor 342 so as to optimize the alignment thereof. More specifically, during the active alignment procedure, the adherent 544 is applied to the outer mounting surface 612 defined by the outer module 560 and/or to the inner mounting surface 516 defined by the lens holder 504. A first apparatus (e.g., a robotic assembly) is then used to position and align the lens holder 504 with the cover glass holder 526, after which, the adherent 544 is subjected to UV and thermal curing processes to form the joint 546 and thereby fix the connection between the lens holder 504 and the cover glass holder 526, which is facilitated by the relative locations of the interface 540 and the electrical connector 512. More specifically, due to the axial misalignment (separation) between the electrical connector 512 and the interface 540 along the optical axis X, direct line-of-sight can be established between the interface 540 and a UV curing apparatus (device) 700. Direct line-of-sight between the interface 540 and the UV curing apparatus 700 inhibits (if not entirely prevents) interference with the curing process (e.g., shadowing of the UV light cast upon the interface 540) that might otherwise be caused by the electrical connector 512, thereby increasing uniformity in the cure of the joint 546 and inhibiting (if not entirely eliminating) shrinkage of the adherent 544 and misalignment between the optical group 508 and the image sensor 342.

Either prior or subsequent to formation of the joint 546, the adherent 548 is applied to the outer mounting surface 534 defined by the PCB 524 and/or to the inner mounting surface 610 defined by the outer module 560 so as to connect the cover glass holder 526 to the PCB 524, which may be performed in a conventional manner, rather than via the aforedescribed active alignment procedure. The adherent 548 is then allowed to cure so as to form the joint 550.

Figure 9:
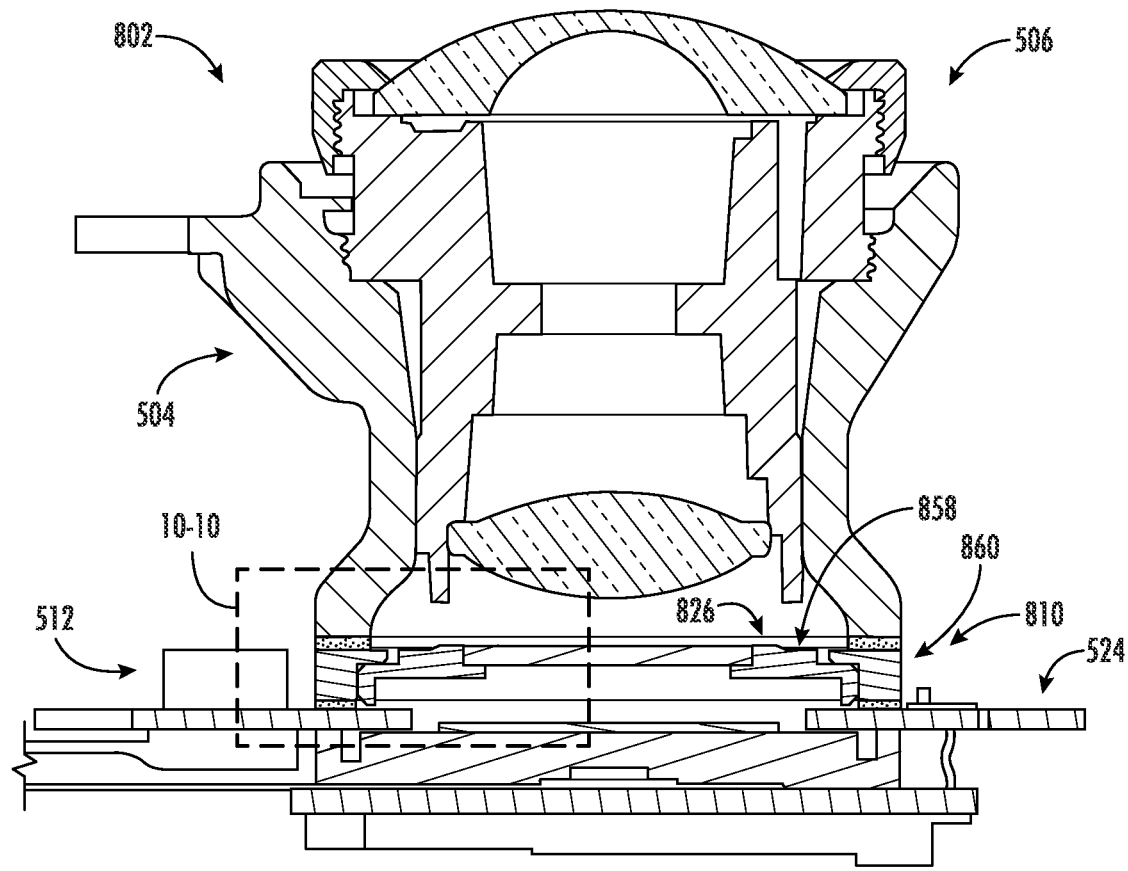
FIG. 9 is an axial (longitudinal) cross-sectional view of another example of an ISLA in an optical module for an image capture apparatus.
Figure 10:
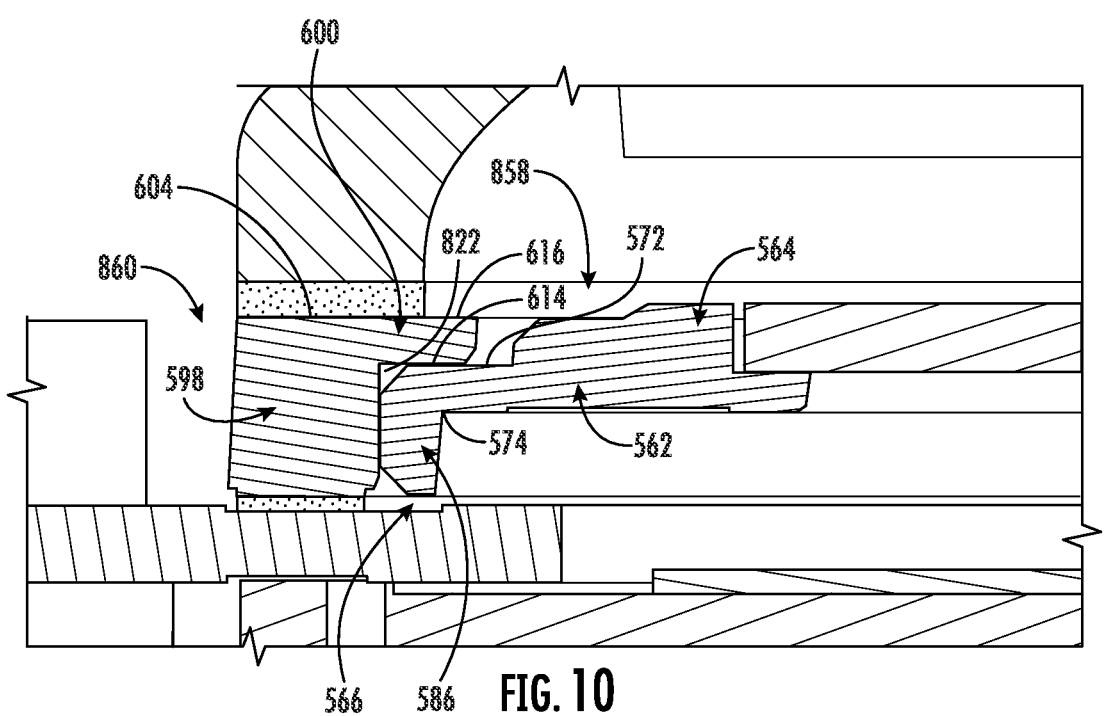
FIG. 10 is an enlargement of the area of detail identified in FIG. 9.

With reference now to FIGS. 9 and 10, an alternate embodiment of the ISLA 502 will be discussed, which is identified by the reference character 802. More specifically, FIG. 9 is an axial (longitudinal) cross-sectional view of the ISLA 802, and FIG. 10 is an enlargement of the area of detail identified in FIG. 9. The ISLA 802 includes features similar to the aforedescribed ISLA 502 and, accordingly, will only be discussed with respect to differences therefrom in the interest of brevity. As such, identical reference characters will be utilized to refer to elements, structures, features, etc., common to the ISLAs 502, 802.

The ISLA 802 includes the lens holder (mount) 504, the lens barrel 506, and the electrical connector 512 discussed above in connection with the ISLA 502 as well as an alternate embodiment of the PCB subassembly 510, which is identified by the reference character 810. The PCB subassembly 810 includes the aforedescribed PCB 524 and an alternate embodiment of the cover glass holder 526, which is identified by the reference character 826 and includes respective inner and outer modules (components) 858, 860. The cover glass holder 826 includes features similar to the aforedescribed cover glass holder 526 and, accordingly, will only be discussed with respect to differences therefrom in the interest of brevity. As such, identical reference characters will be utilized to refer to elements, structures, features, etc., common to the cover glass holders 526, 826.

The inner module 858 includes the base 562, the inner ring 564, and the outer ring 566 discussed above in connection with the aforedescribed cover glass holder 526. In contrast to the aforedescribed cover glass holder 526, however, the outer ring 566 (e.g., the flange 586) is positioned adjacent to (e.g., extends from) the outer radial wall 574 of the base 562**.

The outer module 860 includes the body 598 and the tooth 600 discussed above in connection with the aforedescribed cover glass holder 526. In contrast to the aforedescribed cover glass holder 526, however, the tooth 600 is positioned adjacent to (e.g., extends radially inward from) the outer end wall 604 of the body 598 so as to define a receptacle 822 that is configured to (partially) receive the inner module 858 such that the inner module 858 nests within the outer module 860. More specifically, the tooth 600 is configured such that the outer end wall 604 of the of the body 598 and the outer end wall 616 of the tooth 600 are (generally) aligned along the optical axis X (e.g., such that the outer end walls 604, 616 are arranged in (substantially) colinear relation). As seen in FIG. 10, upon assembly of the ISLA 802, the body 598 is positioned adjacent to (e.g., in contact with) the flange 586 on the inner module 858, and the inner end wall 614 of the tooth 600 is positioned adjacent to (e.g., in contact with) the base 562 of the inner module 558 such that the outer module 860 (e.g., the tooth 600) overlies the inner module 858 (e.g., the base 562 and the flange 586).

As discussed above in connection with the aforedescribed cover glass holder 526, it is envisioned that the inner module 858 and the outer module 860 may be secured (connected) together in any suitable manner (e.g., via an adhesive that is applied to the interface between the body 598 of the outer module 860 and the flange 586 on the inner module 558, the interface between the inner end wall 614 of the tooth 600 and the flange 586, and/or the interface between the inner end wall 614 of the tooth 600 and the outer end wall 572 of the base 562).

Figure 11:
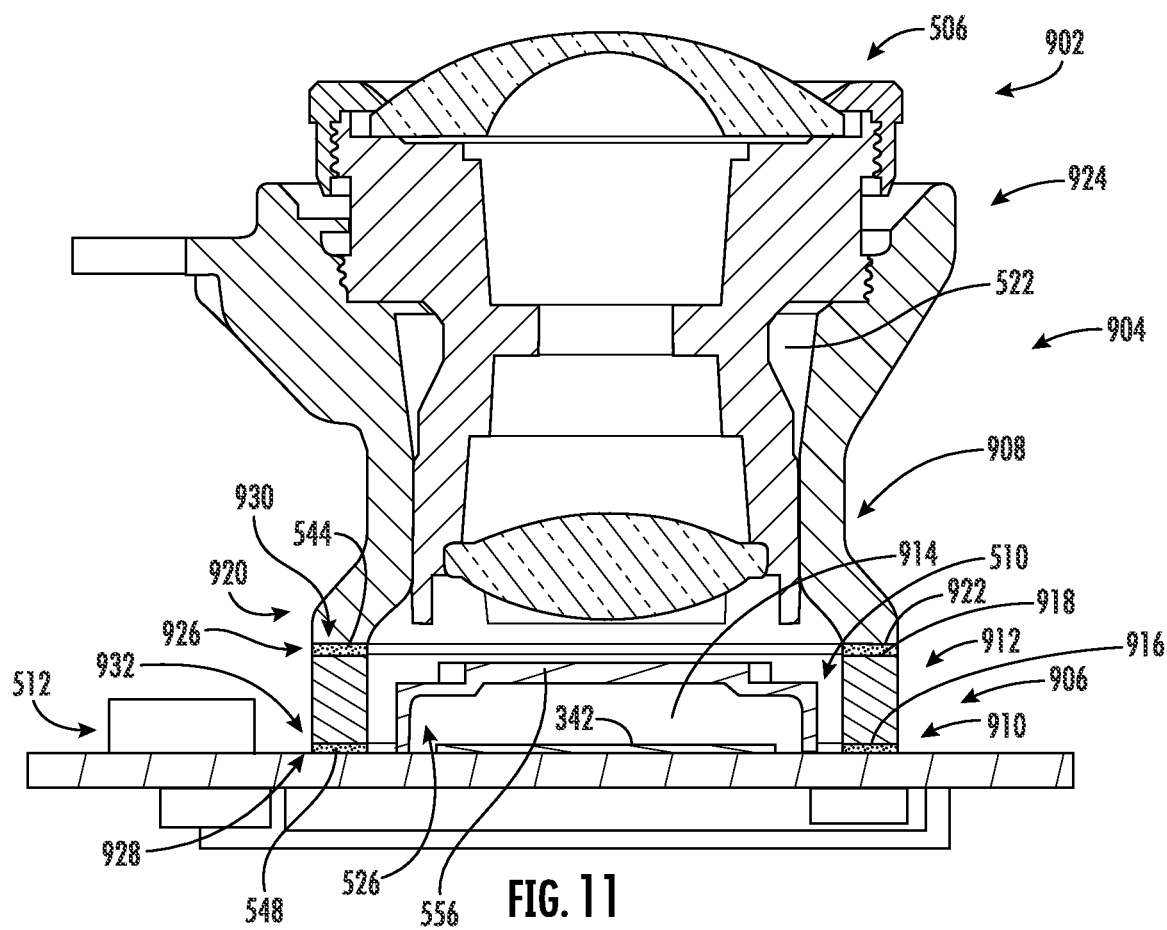
FIG. 11 is an axial (longitudinal) cross-sectional view of another example of an ISLA in an optical module for an image capture apparatus.

With reference now to FIG. 11, another embodiment of the ISLA 502 will be discussed, which is identified by the reference character 902. More specifically, FIG. 11 is an axial (longitudinal) cross-sectional view of the ISLA 902. The ISLA 902 includes features similar to the aforedescribed ISLAs 502, 802 and, accordingly, will only be discussed with respect to differences therefrom in the interest of brevity. As such, identical reference characters will be utilized to refer to elements, structures, features, etc., common to the ISLAs 502, 802, 902.

In addition to the lens barrel 506, the electrical connector 512, and the PCB subassembly 510, the ISLA 902 includes an alternate embodiment of the lens holder 504, which is identified by the reference character 904. The lens holder 904 includes features similar to the aforedescribed lens holder 504 and, accordingly, will only be discussed with respect to differences therefrom in the interest of brevity. As such, identical reference characters will be utilized to refer to elements, structures, features, etc., common to the lens holders 504, 904.

The lens holder 904 includes respective inner and outer modules (components) 906, 908 that are connected together and configured as discrete components of the lens holder 904.

The inner module 906 includes an inner end 910 and an outer end 912. The inner end 910 of the inner module 906 defines a (generally) U-shaped chamber 914, which is configured to receive the cover glass holder 526 and the cover glass 556 such that the inner module 906 is positioned about (e.g., circumscribes) the image sensor 342, and an inner mounting surface 916, and the outer end 912 defines an outer mounting surface 918.

The outer module 908 includes an inner end 920, which defines an inner mounting surface 922, and an outer end 924. Additionally, the outer module 908 defines the internal chamber 522, which receive the lens barrel 506, as discussed above in connection with the aforedescribed lens holder 504.

The inner module 906 is secured (connected) to the outer module 908 and the PCB 524 at respective first and second interfaces 926, 928. The inner module 906 is thus located between, and indirectly connects, the outer module 908 and the PCB 524 such that the outer module 908 and the PCB 524 are spaced axially from each other along the optical axis X and are devoid of any direct connection. More specifically, the inner end 920 of the outer module 908 is secured (connected) to the outer end 912 of the inner module 906 by the adherent 544 so as to define a (first) joint 930, which is subjected to the aforedescribed UV and thermal curing processes discussed above in connection with the ISLA 502, and the inner end 910 of the inner module 906 is secured (connected) to the outer face 530 of the PCB 524 by the adherent 548 so as to define a (second) joint 932. The modules 906, 908 of the lens holder 904 are thus arranged axially in an end-to-end, stacked configuration along the optical axis X, whereby the mounting surfaces 916, 918, 922 are oriented in (generally) parallel relation to each other and in (generally) orthogonal (perpendicular) relation to the optical axis X.

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of up to 25% (e.g., to allow for manufacturing tolerances and/or deviations in design). For example, the term "generally parallel" should be understood as referring to an arrangement in which the pertinent components (structures, elements) subtend an angle therebetween that is equal to 180° as well as an arrangement in which the pertinent components (structures, elements) subtend an angle therebetween that is greater than or less than 180° (e.g., ±10%, ±15%, ±25%). The term "generally parallel" should thus be understood as encompassing configurations in which the pertinent components are arranged in parallel relation. Similarly, the term "generally identical" should be understood as encompassing configurations in which the pertinent components are identical in configuration as well as configurations in which there may be insubstantial variations between the pertinent components that do not influence the substantive construction or performance thereof.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure, etc.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An integrated sensor-lens assembly for an image capture apparatus, the integrated sensor-lens assembly defining an optical axis and comprising:
   a lens holder;
   a cover glass holder secured to the lens holder at a first interface, wherein the cover glass holder includes:
      an inner module; and
      an outer module connected to the inner module, wherein the inner module and the outer module are configured as discrete components of the cover glass holder; and
   a printed circuit board secured to the cover glass holder at a second interface, whereby the cover glass holder indirectly connects the lens holder to the printed circuit board such that the lens holder and the printed circuit board are devoid of any direct connection.

2. The integrated sensor-lens assembly of claim 1, further comprising:
   a lens barrel located within the lens holder and housing an optical group.

3. The integrated sensor-lens assembly of claim 2, further comprising:
   an image sensor supported by the printed circuit board, wherein the optical group is actively aligned with the image sensor.

4. The integrated sensor-lens assembly of claim 1, wherein the cover glass holder is unitary in construction.

5. The integrated sensor-lens assembly of claim 1, wherein the inner module includes a first material of construction, and wherein the outer module includes a second material of construction different than the first material of construction.

6. The integrated sensor-lens assembly of claim 1, wherein the inner module defines an outer radial wall and the outer module defines an inner radial wall in contact with the outer radial wall.

7. The integrated sensor-lens assembly of claim 5, wherein the cover glass holder is configured such that the outer radial wall and the inner radial wall are oriented in generally parallel relation to the optical axis.

8. The integrated sensor-lens assembly of claim 1, further comprising:
   an electrical connector spaced radially outward from the cover glass holder with respect to the optical axis.

9. The integrated sensor-lens assembly of claim 8, wherein the electrical connector is generally aligned with second interface and is spaced axially from the first interface along the optical axis.

10. An integrated sensor-lens assembly for an image capture apparatus, the integrated sensor-lens assembly defining an optical axis and comprising:
    a lens holder;
    a lens barrel located within the lens holder and housing an optical group;
    a cover glass holder secured to the lens holder at a first interface using a first adherent, wherein the cover glass holder includes:
       an inner module defining an outer radial wall; and
       an outer module defining an inner radial wall connected to the outer radial wall of the inner module;
    a printed circuit board secured to the cover glass holder at a second interface using a second adherent different than the first adherent such that the lens holder is spaced from the printed circuit board along the optical axis; and
    an image sensor supported by the printed circuit board and actively aligned with the optical group.

11. The integrated sensor-lens assembly of claim 10, wherein the cover glass holder is unitary in construction.

12. The integrated sensor-lens assembly of claim 11, wherein the inner module and the outer module include dissimilar materials of construction.

13. The integrated sensor-lens assembly of claim 10, further comprising:
    an electrical connector spaced radially outward from the cover glass holder with respect to the optical axis, wherein the electrical connector is generally aligned with the second interface and is spaced axially from the first interface along the optical axis.

14. A method of assembling an integrated sensor-lens assembly for an image capture apparatus, the method comprising:
    assembling a cover glass holder by connecting an inner module of the cover glass holder to an outer module of the cover glass holder, wherein the inner module and the outer module are configured as discrete components of the cover glass holder;
    actively aligning a lens holder with a cover glass holder;
    connecting the lens holder to the cover glass holder; and
    connecting the cover glass holder to a printed circuit board such that the lens holder is spaced from the printed circuit board along an optical axis of the integrated sensor-lens assembly.

15. The method of claim 14, wherein connecting the lens holder to the cover glass holder includes UV curing an adherent between the lens holder and the cover glass holder.

16. The method of claim 15, further comprising:
    securing an electrical connector to the printed circuit board such that the electrical connector is spaced axially from the adherent along the optical axis.

17. The method of claim 16, wherein securing the electrical connector to the printed circuit board includes:
    positioning the electrical connector radially outward from the cover glass holder with respect to the optical axis; and
    generally aligning the electrical connector with an interface between the cover glass holder and the printed circuit board.

18. The method of claim 14, wherein assembling the cover glass holder further includes:
    nesting a cover glass within the inner module such that the cover glass overlies an image sensor supported by the printed circuit board.

19. The method of claim 14, wherein assembling the cover glass holder further includes:
    positioning the inner module and the outer module such that an outer radial wall of the inner module and an inner radial wall of the outer module are oriented in generally parallel relation to the optical axis.

20. The method of claim 19, wherein assembling the cover glass holder further includes:
    connecting the outer radial wall of the inner module to the inner radial wall of the outer module.

* * * * *